United States Patent
Neumann et al.

(10) Patent No.: US 10,038,357 B2
(45) Date of Patent: Jul. 31, 2018

(54) METHOD FOR REPAIRING OR SERVICING A WYE RING

(71) Applicant: General Electric Company, Schenectady, NY (US)

(72) Inventors: Ulrich Werner Neumann, Simpsonville, SC (US); Brent Hamilton Holloway, Greenville, SC (US)

(73) Assignee: General Electric Company, Schenectady, NY (US)

(*) Notice: Subject to any disclaimer, the term of this patent is extended or adjusted under 35 U.S.C. 154(b) by 1188 days.

(21) Appl. No.: 14/055,244

(22) Filed: Oct. 16, 2013

(65) Prior Publication Data

US 2015/0101180 A1    Apr. 16, 2015

(51) Int. Cl.
*H02K 15/00* (2006.01)
*H02K 3/51* (2006.01)
*H02K 7/18* (2006.01)

(52) U.S. Cl.
CPC ........... *H02K 15/0006* (2013.01); *H02K 3/51* (2013.01); *H02K 7/1838* (2013.01); *Y02E 10/725* (2013.01); *Y10T 29/49011* (2015.01)

(58) Field of Classification Search
CPC ............ H02K 7/1838; H02K 15/0006; H02K 15/165; H02K 3/51; B02B 17/0034; Y10T 29/49009; Y10T 29/49318; Y10T 29/53143; Y10T 29/49011; Y02E 10/725
See application file for complete search history.

(56) References Cited

U.S. PATENT DOCUMENTS

| | | | |
|---|---|---|---|
| 8,397,382 B2* | 3/2013 | Anasis | B23P 6/002 29/889.1 |
| 9,083,220 B2* | 7/2015 | Neumann | H02K 15/0081 |
| 2015/0101180 A1* | 4/2015 | Neumann | H02K 15/0006 29/597 |
| 2015/0204193 A1* | 7/2015 | Anasis | F01D 5/005 29/889.1 |

OTHER PUBLICATIONS

Bill Moore & Clyde Maughan, "Generator Stator End Winding Resonance: Problems and Solutions", Proceedings of the ASME 2013 Power Conference, POWER2013, Jul. 29-Aug. 1, 2013, pp. 1-7, ASME, Boston, Massachusetts, USA.

* cited by examiner

*Primary Examiner* — Carl Arbes
(74) *Attorney, Agent, or Firm* — James W. Pemrick; Ernest G. Cusick; Frank A. Landgraff

(57) ABSTRACT

A method for repairing or servicing a wye ring of a generator includes the steps of, dismantling the generator to gain access to the wye ring, determining a fault location in the wye ring; and attaching a patch to the wye ring in an area of the fault location. The patch provides an electrical path around the fault location so that the generator is repaired.

23 Claims, 12 Drawing Sheets

METHOD FOR REPAIRING OR SERVICING A WYE RING

BACKGROUND OF THE INVENTION

The method and system described herein relates generally to generator service or repair. More specifically, the method and system relates to servicing or repairing a wye ring in a wind turbine generator in-situ.

At least some known wind turbines include machines for converting variable speed mechanical input from blades of the wind turbine into electric power that is compliant with an electrical grid. For example, some known wind turbines include a doubly fed induction generator (DFIG) for converting the variable speed mechanical input.

Some known DFIG generator rotors have a floating neutral point. This is frequently provided by a wye ring. The wye ring is typically made from a copper bar and is located at the non-drive end (NDE) of the generator. Due to operational stresses which fatigue the brazed connection between the wye ring and its rotor connection points (or terminal lugs), cracks can develop which lead to discontinuity. When the first crack occurs, the generator continues to function satisfactorily since the current can still reach all three rotor connection points. However, if a second crack occurs in the wye ring, at least one part (e.g., one phase) of the rotor windings are now disconnected from the floating neutral. This results in severe arcing across one of the cracks, and leads to failure of the insulation around the wye ring. Eventually, cross-over arcing occurs between the wye ring and the phase lead. The wind turbine monitoring system detects this cross-over arcing condition and recognizes it as a phase fault, and accordingly shuts the wind turbine down.

In the past, the only way to repair a cracked wye ring was to replace the entire generator. Shipping a new generator from storage to a remote wind site, and then shipping the faulty generator back to storage is an expensive task that can often times exceed the cost of a new generator. Further, to accomplish this repair, a crane capable of lifting heavy loads (e.g., 10 metric tons) to great heights (e.g., 80 meters-100 meters) is required. Cranes of this type are expensive and the generator replacement operation is costly and time consuming. In addition, the wind turbine must be out of service until the new generator is installed.

BRIEF DESCRIPTION OF THE INVENTION

In an aspect of the present invention, a method for repairing or servicing a wye ring of a generator includes the steps of, dismantling the generator to gain access to the wye ring, determining a fault location in the wye ring; and attaching a patch to the wye ring in an area of the fault location. The patch provides an electrical path around the fault location so that the generator is repaired.

In another aspect of the present invention, a method for servicing a wye ring of a generator includes the steps of dismantling the generator to gain access to the wye ring and attaching a patch to the wye ring in a potential or current fault location. The patch provides an electrical path around the fault location. The method may be performed on the generator in-situ.

In yet another aspect of the present invention, a system for repairing or servicing a wye ring of a generator includes a patch attached to the wye ring in a potential or current fault location. The patch provides an electrical path around the fault location. The patch is attached to the wye ring of the generator in-situ. The patch has a patch end shaped in at least one of the following shapes, rectangular, diagonal, rounded, elliptical, triangular or semi-rounded. A C-shaped, insulating cuff is attached to the patch and/or the wye ring.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
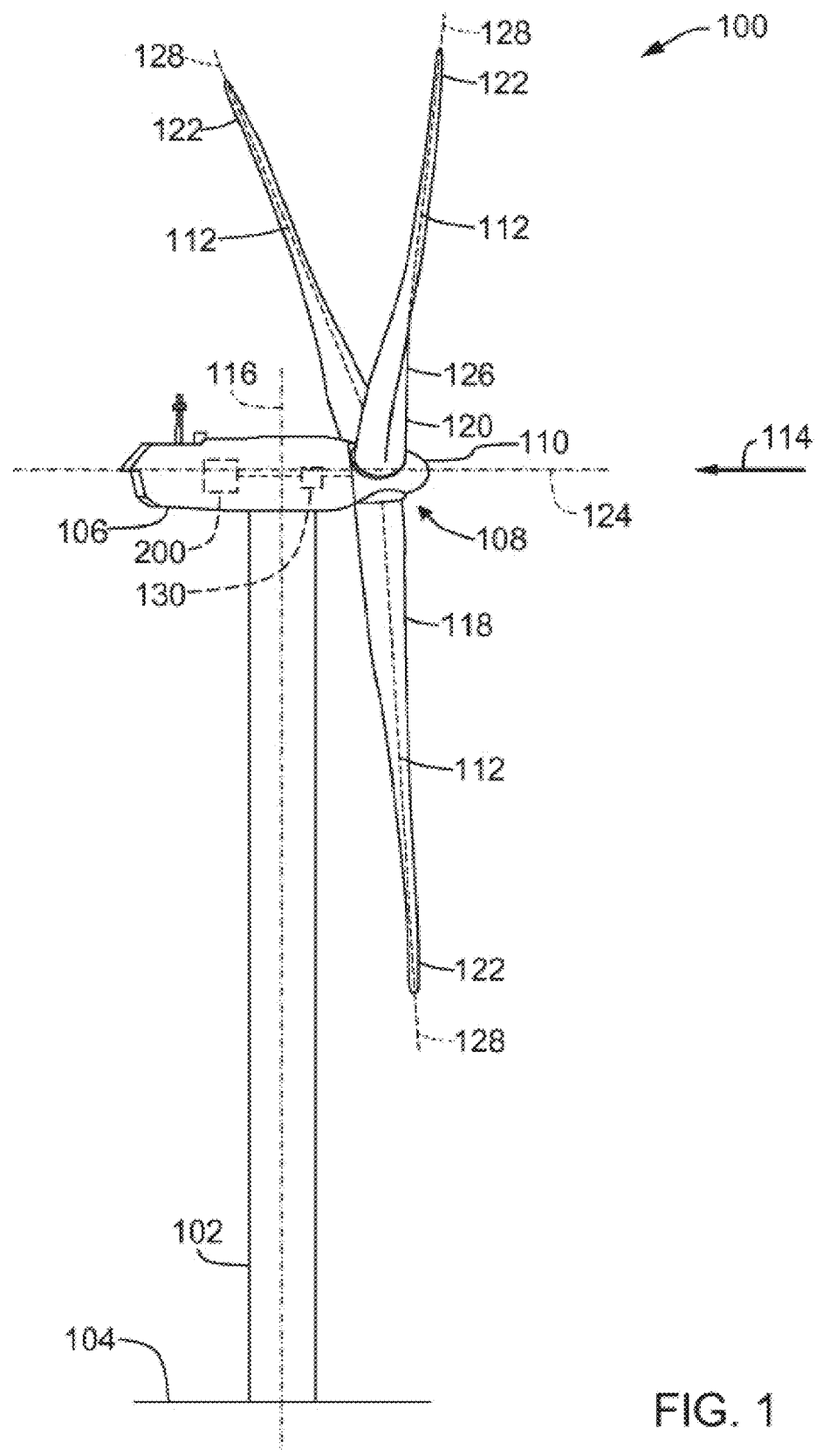
FIG. 1 is a perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. Wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a main shaft assembly 108 is coupled to nacelle 106. Main shaft assembly 108 includes a rotatable hub 110 and a plurality of rotor blades 112 coupled to hub 110. Main shaft assembly 108 includes three rotor blades 112. Alternatively, main shaft assembly 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating main shaft assembly 108, thereby transferring kinetic energy from wind 114 into usable mechanical energy, and subsequently, electrical energy. Main shaft assembly 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

Rotor blades 112 may have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of main shaft assembly 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112, and the pitch angles of rotor blades 112 may be controlled individually. Further, wind turbine 100 includes a main gearbox 130 and a generator 200 within nacelle 106. Main shaft assembly 108 includes a low-speed shaft (not shown in FIG. 1) that extends into main gearbox 130 and a high-speed shaft (not shown in FIG. 1) extends to generator 200.

Figure 2:
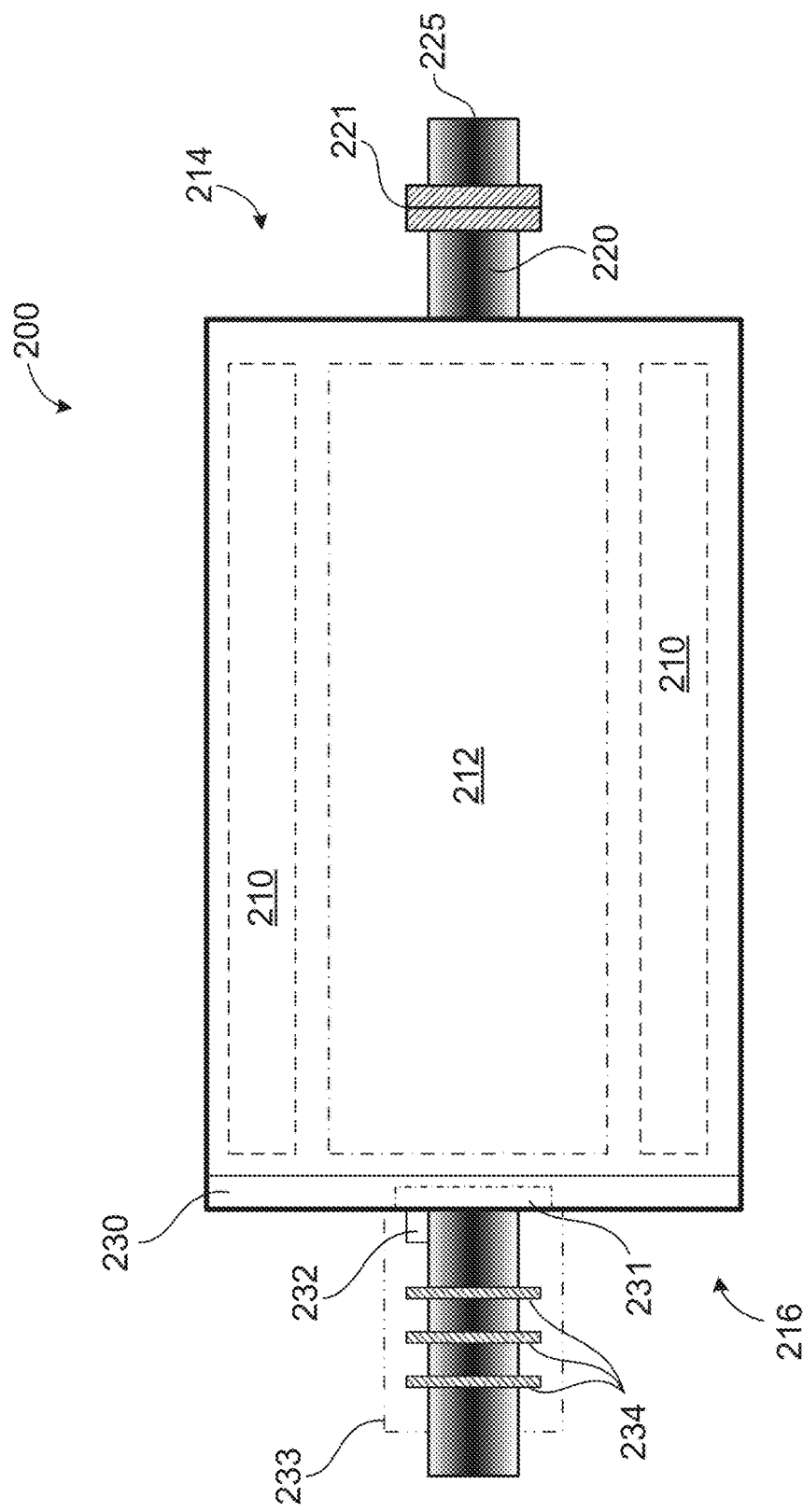
FIG. 2 illustrates a schematic view of a known generator.

FIG. 2 illustrates a schematic view of generator 200. Generator 200 includes a stator 210 and rotor 212. The generator input shaft 220 is coupled to the gearbox output shaft 225 via a coupling 221. Typically, coupling 221 is a bolted flange configuration. The generator input shaft 220 is located at the drive end (DE) 214 of the generator. The opposing end of the generator 200 is the non-drive end (NDE) 216. The non-drive end 216 includes a bearing shield 230. The bearing shield 230 may also include an inner bearing cover 231, and the outside of the bearing shield 230 may be configured for attachment of an oil slinger 232, and a slip ring housing 233 containing slip rings 234.

Figure 3:
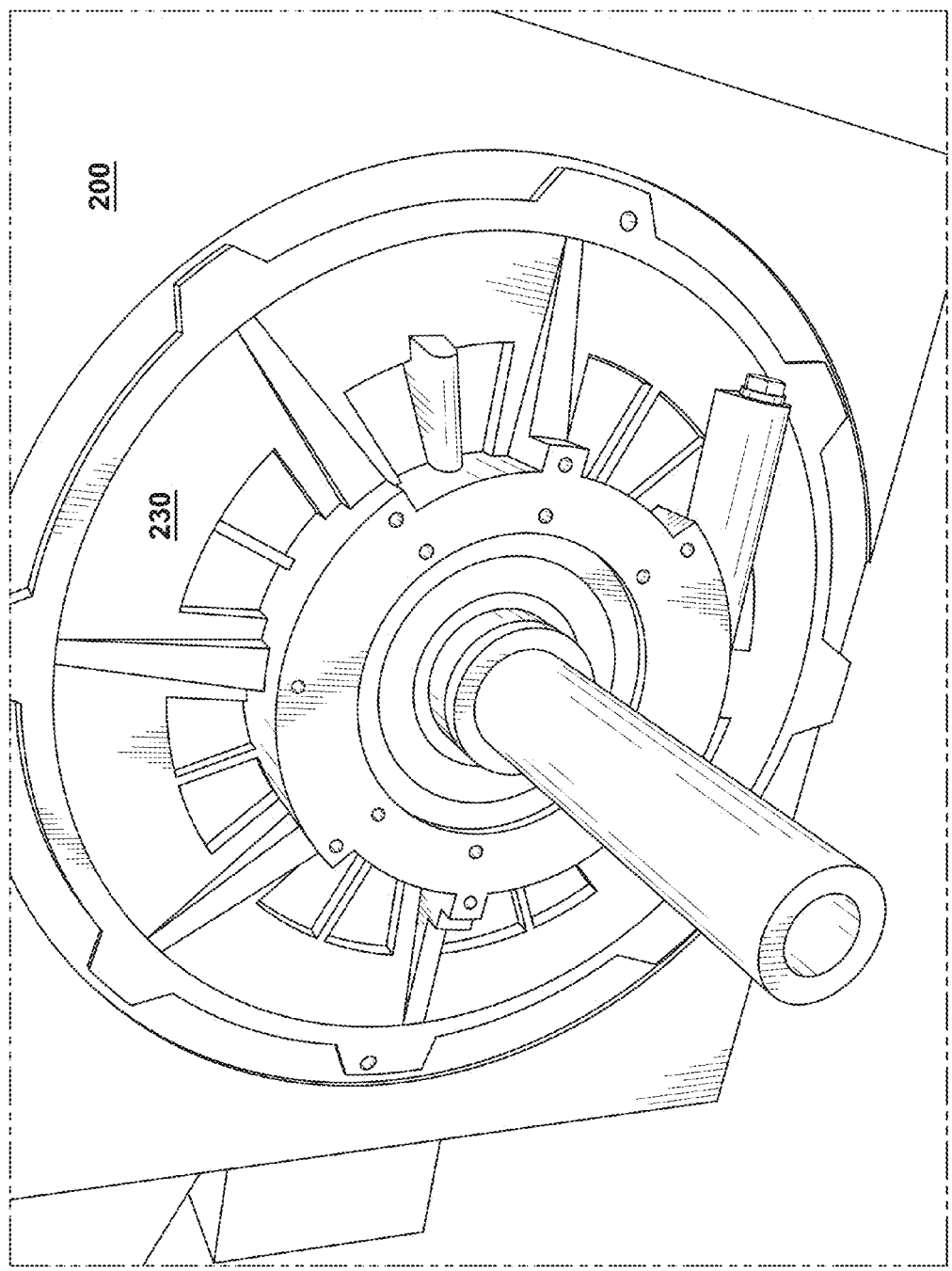
FIG. 3 illustrates a perspective view of the non-drive end of a generator.

FIG. 3 illustrates a perspective view of the non-drive end 216 of generator 200. The bearing shield 230 is shown attached to the generator 200, however the slip ring housing 233, slip rings 234 and other parts have been removed. It can be seen that the existing bearing shield is a solid cover (except for the portion that the rotor shaft passes therethrough).

Figure 4:
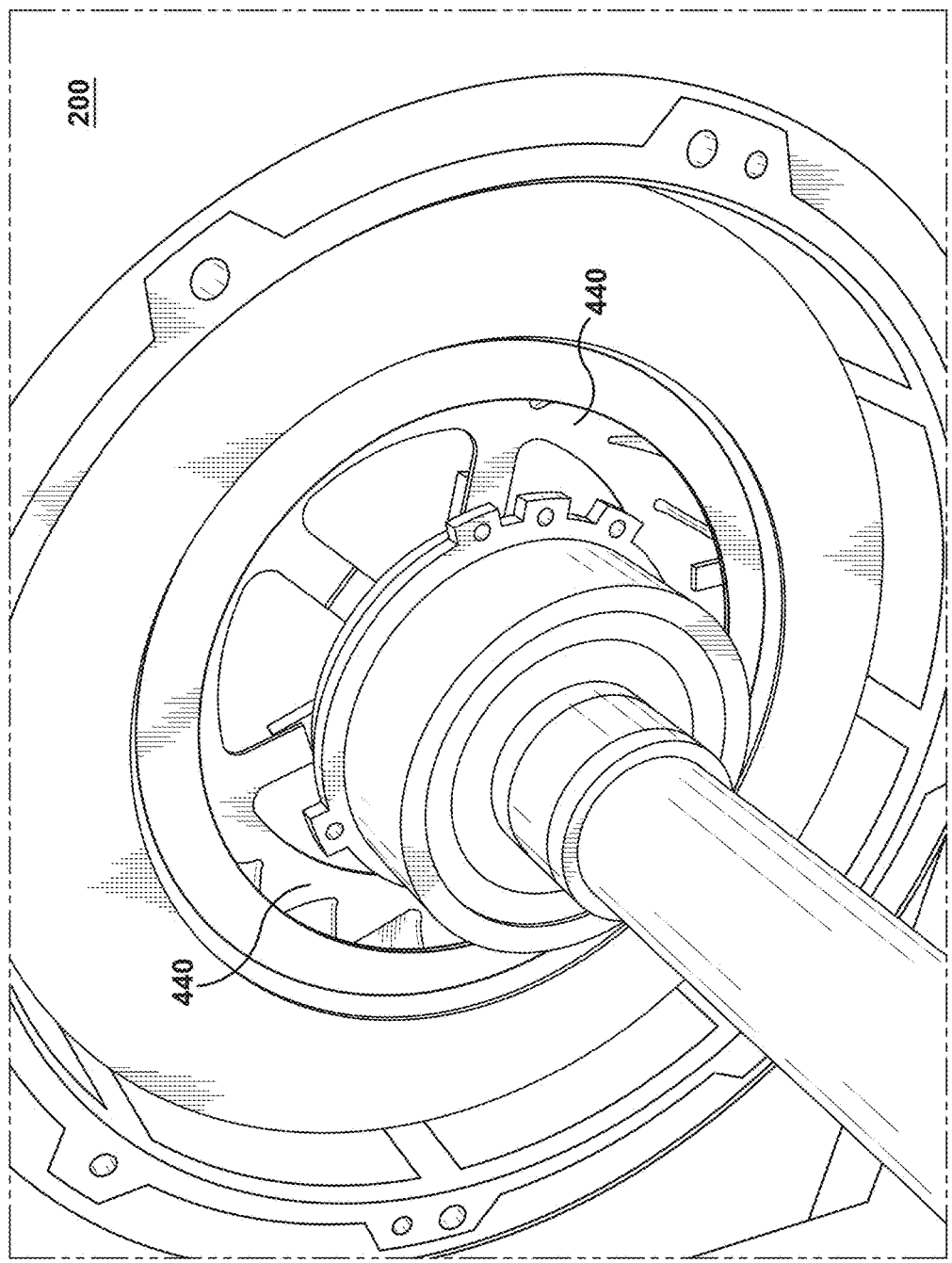
FIG. 4 illustrates a perspective view of the non-drive end a generator with the bearing shield removed.

FIG. 4 illustrates a perspective view of the non-drive end 216 of generator 200 with the bearing shield 230 removed. A generator rotor fan 440 is attached to the rotor and is configured as a radial flow fan. However, the rotor fan 440 could also be an axial flow type fan as well. Access to the rotor fan is important during an operation to repair the wye ring, as will be described in more detail hereinafter.

Figure 5:
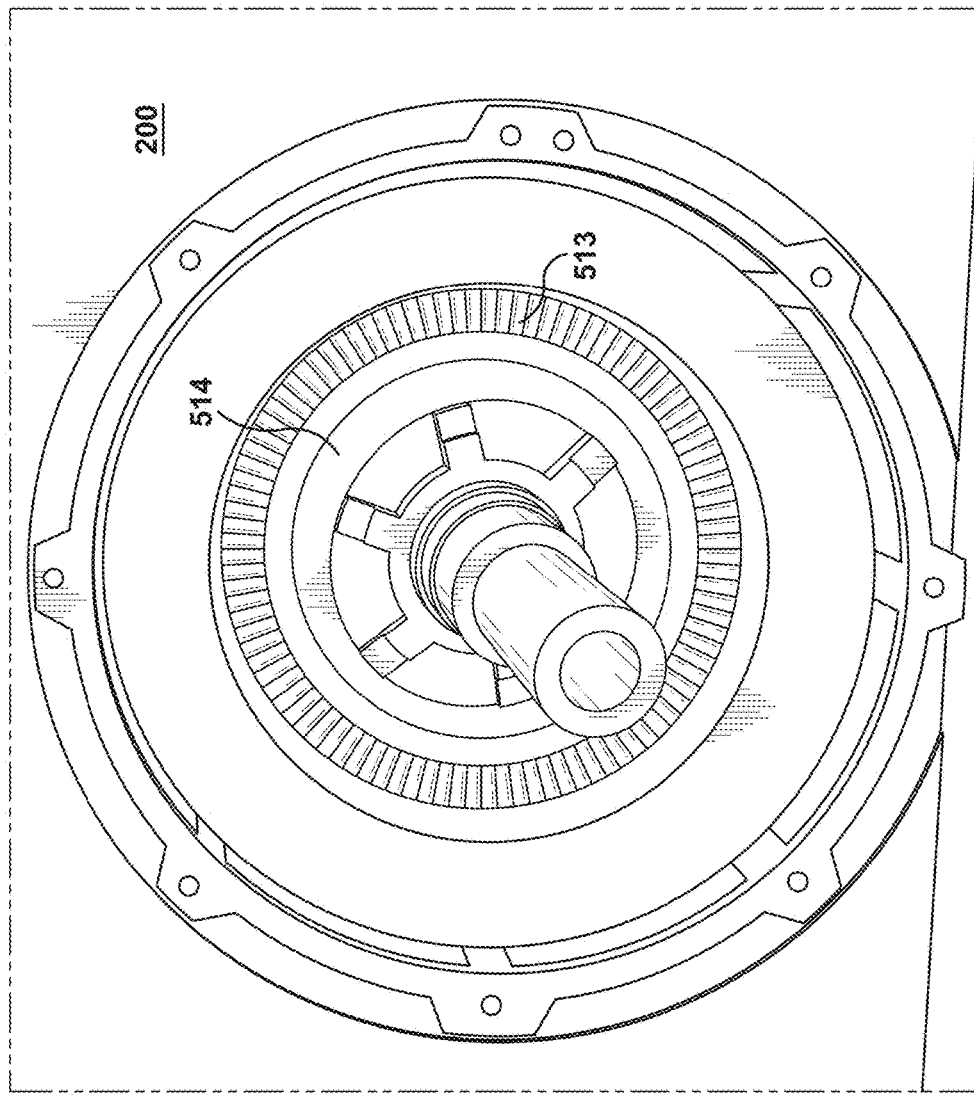
FIG. 5 illustrates a perspective view of the non-drive end of a generator with the rotor fan removed.

FIG. 5 illustrates a perspective view of the non-drive end 216 of generator 200 with the rotor fan 440 removed. The rotor's end windings 513 extend circumferentially around the rotor. The end-windings 513 are connected to a wye-ring 514 that is fit radially inside the end windings 513. The wye ring 514 is typically one or more copper bars curved into a generally circular shape, and the wye ring 514 provides a floating neutral connection for the (typically) three phases of the rotor windings. The wye-ring 514 is normally insulated by wrapping and/or encapsulating in dielectric material.

Figure 6:
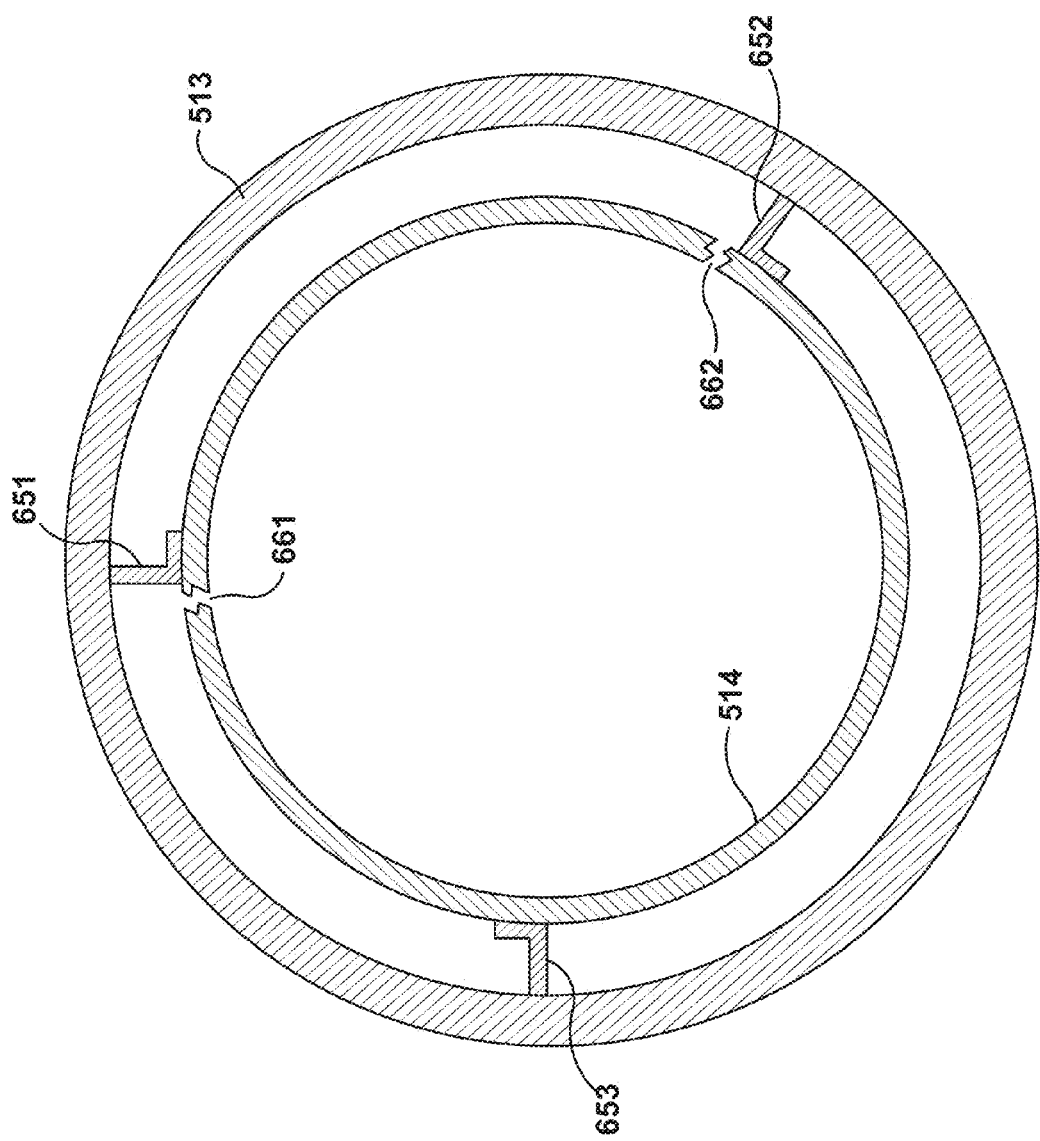
FIG. 6 illustrates a schematic view of the rotor end windings connected to the wye ring.

As stated previously, operational wear and tear can cause cracks in the wye-ring 514. If two or more cracks develop, the generator malfunctions and must be shut down. FIG. 6 illustrates a schematic view of the rotor end windings 513 connected to the wye ring 514. Connection lugs 651, 652 and 653 are used to electrically connect the wye ring 514 to the end windings 513. Typically, the connection lugs are brazed to the wye ring 514 as both are made of copper. The brazed joint experiences strain during operation of the generator. For example, thermal expansion and contraction may not be uniform between the rotor end windings 513 and the wye ring 514, and this uneven expansion and contraction stresses the brazed joint as well as the wye ring itself. Unfortunately, after an extended period of time a crack 661 may form in the wye ring near connection lug 651. A single crack is not catastrophic, as current can still flow to the nearby connection point. However, crack 661 does impose additional loads on the other two connection lugs 652 and 653. If a second crack 662 develops near connection lug 662, one of the phases (via connection lug 651) is now isolated from the floating neutral. Arcing between the cracks will degrade the insulation and will trigger machine faults.

In the past, there was no way to repair a cracked (or otherwise malfunctioning) wye ring 514 up-tower, or in-situ. The entire old generator had to be removed and a new generator was brought up to the nacelle and installed. As one might expect, this was a very expensive and time consuming operation, but the only known way to fix the generator. According to an aspect of the present invention, the wye ring 514 may be repaired up-tower (in situ) by applying a patch to the wye ring.

Figure 7:
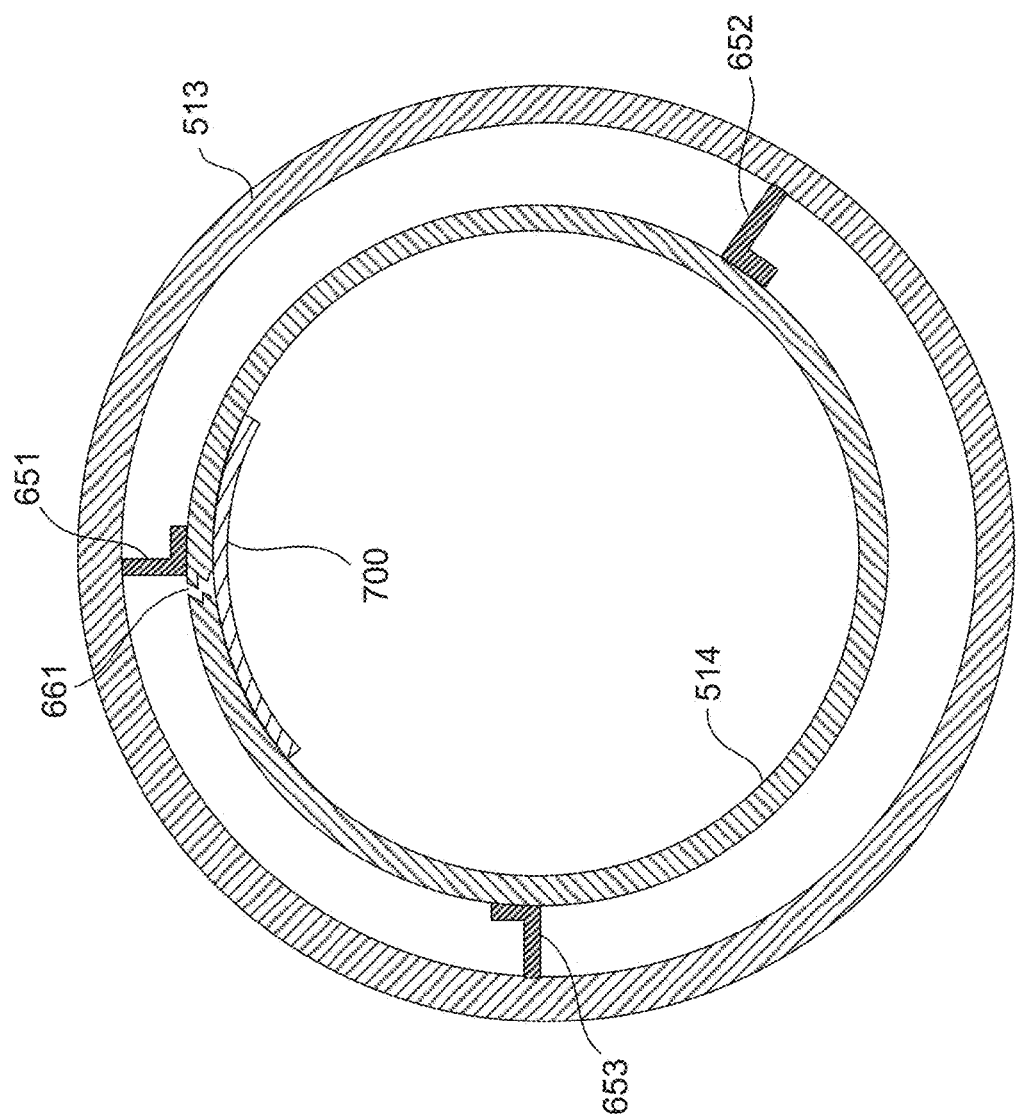
FIG. 7 illustrates a schematic view of a repair (or reinforcing) patch attached to the wye ring, according to an aspect of the present invention.

FIG. 7 illustrates a schematic view of a repair (or reinforcing) patch 700 attached to wye ring 514. The patch 700 is mechanically and electrically connected to the wye ring 514 in the area of the fault location (or crack) 661. The patch 700 is formed of an electrically conducting material, such as but not limited to, copper, copper alloys, aluminum or any other suitable material. The patch 700 can be attached, across the crack 661 by soldering, brazing, electrically conductive adhesive, mechanical joining or a combination of these methods. The dimension of patch 700 is also important, as it has to be sized such that a substantially unimpeded conductivity exists across the fault location 661. For example, the patch 700 may have a width (in the axial direction) of about 25 mm, a thickness (in the radial direction) of about 4 mm, and a length (in the circumferential direction) of about 300 mm. However, any suitable length, width and thickness may be employed for patch 700 as required by the specific wye ring 514.

Figure 8:
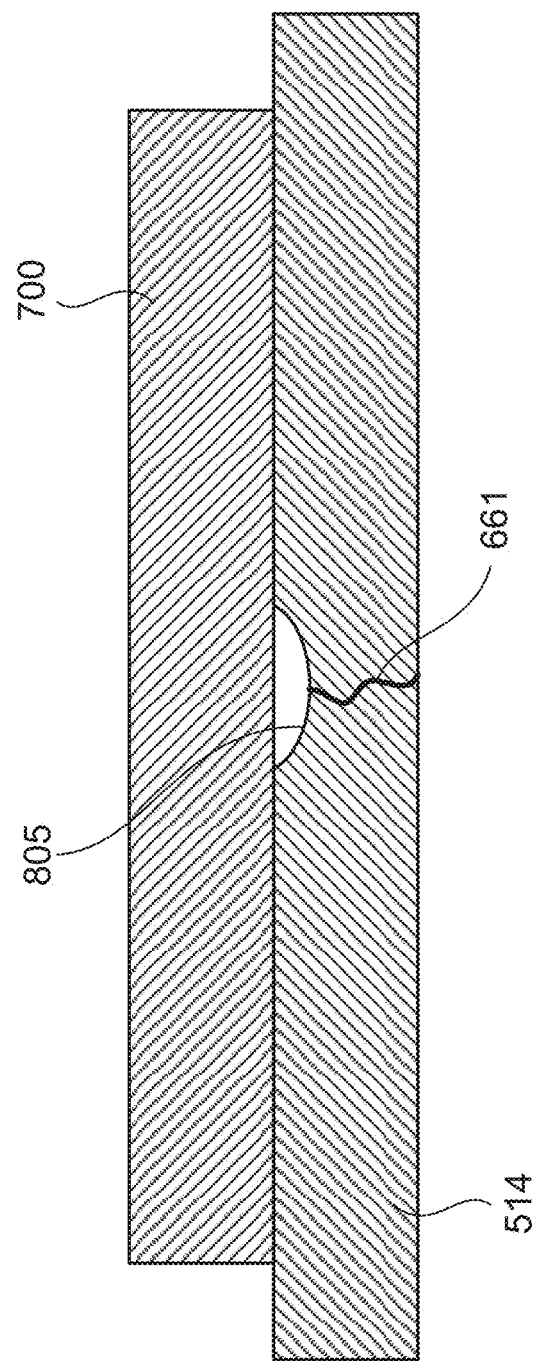
FIG. 8 illustrates a cross-sectional view of patch attached to the wye ring, according to an aspect of the present invention.

FIG. 8 illustrates a cross-sectional view of patch 700 attached to wye ring 514, according to an aspect of the present invention. A portion of the wye ring 514 can be smoothed or hollowed out to form a concavity as indicated by surface 805. This hollowed region (or concavity) 805 prevents crack propagation into patch 700 by formation of a barrier region. The concavity can be formed by machining (e.g., grinding, sanding, drilling, etc.) a depression into the wye ring 514 at the location of crack 661. The air barrier created (between the patch 700 and wye ring 514) prevents further crack propagation.

Figure 9:
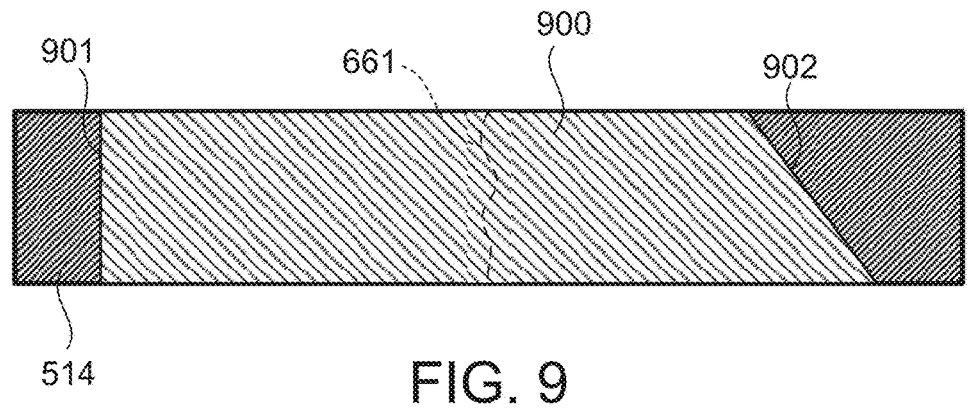
FIGS. 9-11 illustrate top views of the patch attached to the wye ring, according to an aspect of the present invention.
Figure 10:
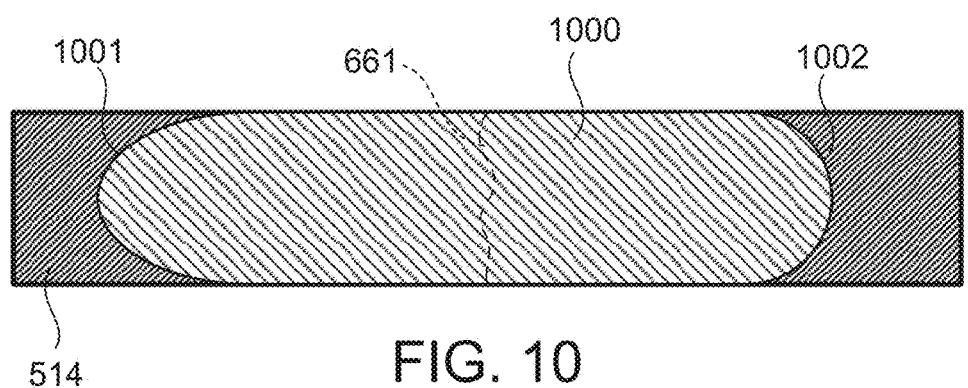
Figure 11:
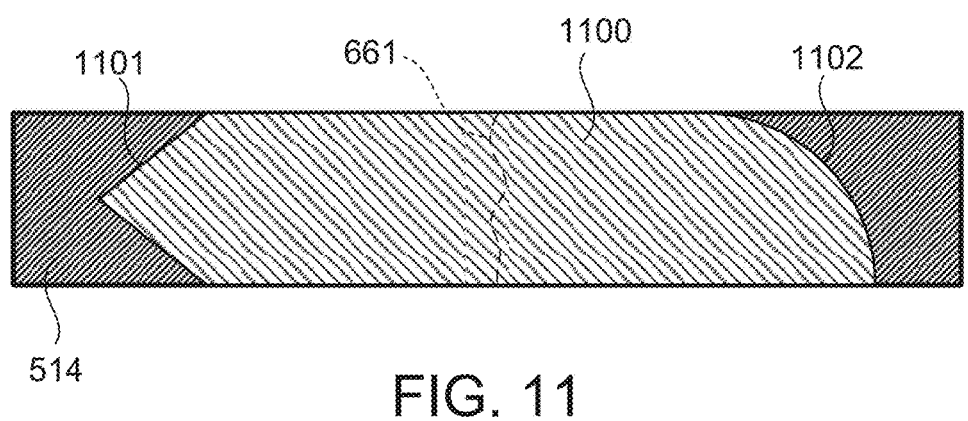

FIGS. 9-11 illustrate a top view of the patch attached to the wye ring. The ends of the patch distribute stresses during operation of generator 200. Accordingly, the shape of the patch can be very important. FIG. 9 shows the patch 900 attached to wye ring 514 having a rectangular (or square) shaped patch end 901 and a diagonal shaped patch end 902. FIG. 10 shows the patch 1000 attached to wye ring 514 having an elliptically shaped patch end 1001 and a rounded shaped patch end 1002. FIG. 11 shows the patch 1100 attached to wye ring 514 having a triangular shaped patch end 1101 and a semi-rounded shaped patch end 1102.

Figure 12:
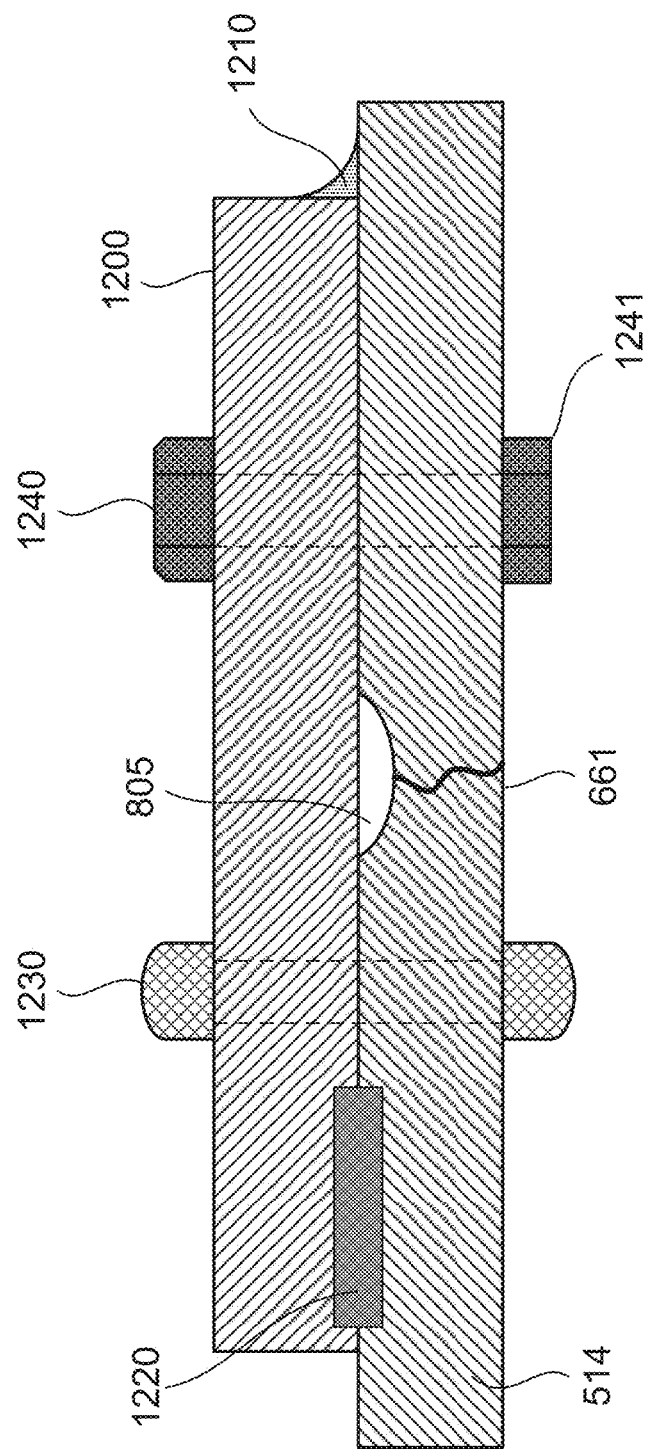
FIG. 12 illustrates a cross-sectional view of the patch attached to the wye ring with various means of attachment, according to an aspect of the present invention.

FIG. 12 illustrates a cross-sectional view of the patch 1200 attached to the wye ring 514 with various means of attachment. The patch 1200 needs to be securely and electrically connected to the wye ring 514. Various means of attachment may be employed and are described herein. The patch 1200 may be brazed or soldered on via braze or solder 1210. Suitable braze alloys may be BAg alloys, BCuP alloys, aluminum alloys, silver alloys, nickel alloys or any other suitable braze or solder. The patch 1200 may be glued on with an electrically conductive adhesive 1220, such as Loctite® 3888 (a registered trademark of Henkel Loctite), or any other suitable high strength, high conductivity adhesive. The patch 1200 could also be mechanically joined to the wye ring 514 by the use of mechanical fasteners 1230, 1240, 1241. For example, a rivet 1230 could be formed of a conventional or blind rivet, or a bolt 1240 and nut 1241 could be used. Alternatively, to avoid use of nut 1241 the bolt 1240 could be used with a tapped hole formed in the wye ring 514. These mechanical fasteners would pass through both the patch 1200 and the wye ring 514 to securely bond the two elements. In addition, a combination of multiple types of fastening elements may be used together. As non-limiting examples only, the adhesive 1220 could be used together with bolt 1240 and nut 1241, or braze/solder 1210 could be used with rivet 1230.

Figure 13:
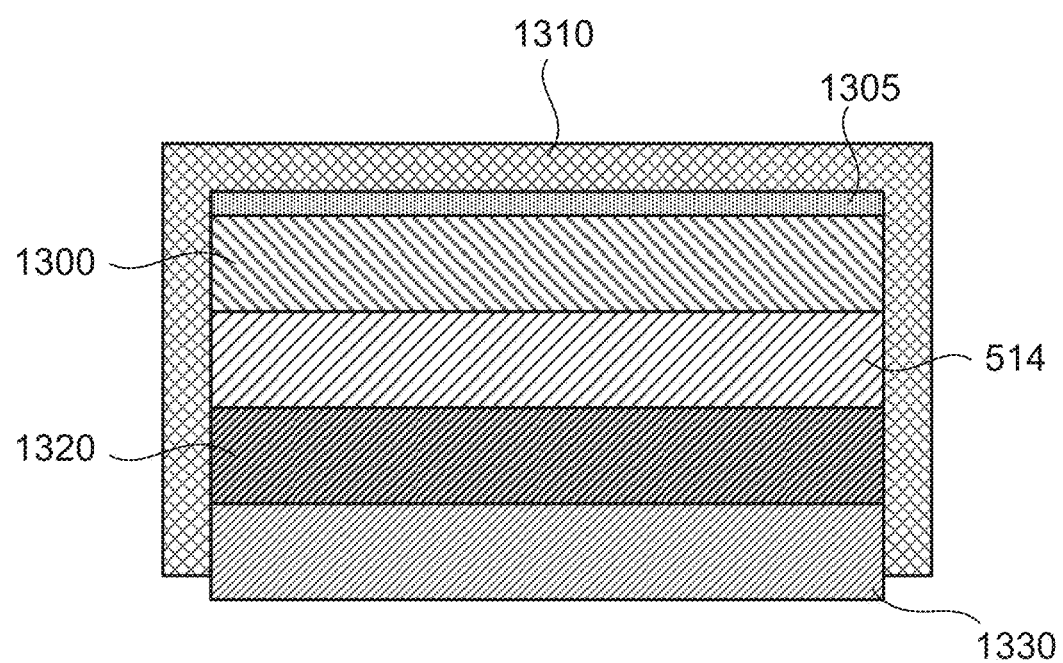
FIG. 13 illustrates a cross-sectional view of an insulating system for the wye ring repair, according to an aspect of the present invention.

FIG. 13 illustrates a cross-sectional view of an insulating system for the wye ring repair, according to an aspect of the present invention. The wye ring 514 is typically insulated with a fiberglass tape, and this tape needs to be partially removed so that patch 1300 can be attached to wye ring 514. After the patch 514 is attached, the exposed portions will need to be insulated. Re-wrapping with fiberglass tape is difficult when the repair is performed up-tower. A solution to this problem is to use a C-shaped insulating cuff 1310, and this cuff 1310 may be formed of fiberglass, rubber, ceramic or any other suitable material for high voltage insulation. The repair area may involve the patch 1300, wye ring 514, phase lead 1320 and jumper 1330. These multiple conductive layers make it difficult to re-wrap fiberglass tape. The cuff 1310 may be attached to the repair (i.e., the patch 1300 and/or the wye ring 514) via adhesive 1305. The adhesive 1305 may have high insulating properties, or be any suitable high strength, insulating adhesive.

Figure 14:
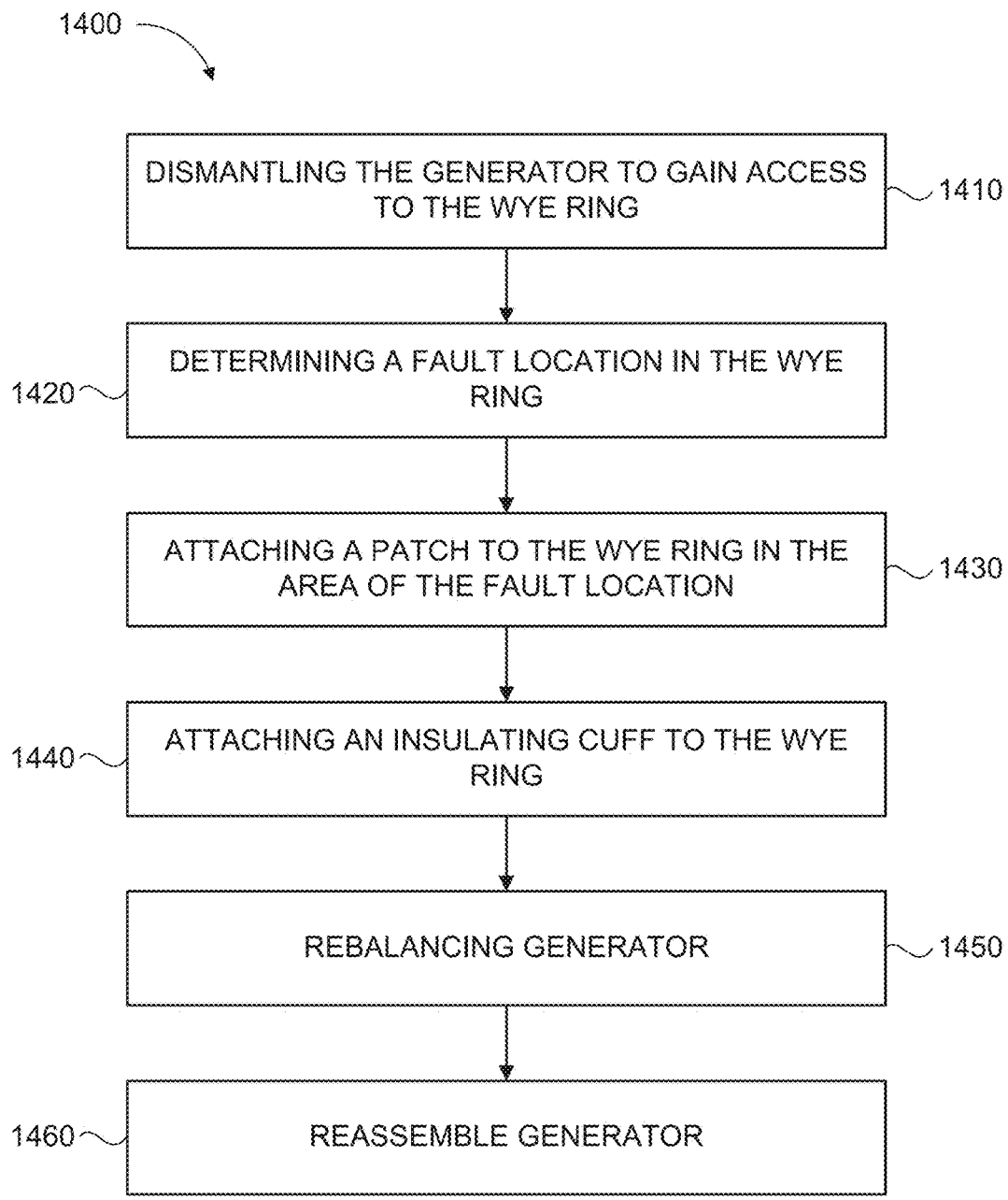
FIG. 14 illustrates a flowchart for a method of repairing the wye ring of the generator, according to an aspect of the present invention.

FIG. 14 illustrates a flowchart for a method 1400 for repairing the wye ring 514 of generator 200, according to an aspect of the present invention. The method 1400 includes the steps of dismantling 1410 the generator to gain access to the wye ring, determining 1420 a fault location in the wye ring, and attaching 1430 a patch to the wye ring in the area of the fault (or crack) location. The patch provides an electrical path around the fault location so that the wye ring is repaired. This method can be performed on the generator in-situ or up-tower. The dismantling step 1410 may also include dismantling a non-drive end 216 of the generator 200 to expose the wye ring 514 and the connection lugs 651-653. The determining step 1420 may also include removing insulation from portions of the wye ring to enable visual identification of the fault location, and/or electrically testing the wye ring to determine the fault location. The attaching step 1430 may include attaching the patch by at least one of, soldering, brazing, electrically conductive adhesive, or mechanical joining. The patch may also be comprised of copper, and/or has a patch end shaped in at least one of the following shapes, rectangular, diagonal, rounded, elliptical, triangular or semi-rounded. The patch may be applied to a radially inner surface of the wye ring. Method 1400 may also include an attaching step 1440 of attaching an insulating cuff 1310 to the wye ring 514. The cuff 1310 may be attached to the wye ring 514 with adhesive. Furthermore, the cuff 1310 may be substantially C-shaped.

After installing the patch and/or insulating cuff, the generator 200 may need to be rebalanced. Step 1450 rebalances the generator (if needed), and this can be accomplished by adding weight to the rotor 212, fan 440, or any other suitable location. The weight is added in amounts and locations to counterbalance any imbalance caused by the patch installation. In step 1460 the generator is reassembled.

The method may also be used to service a generator in a pro-active manner. The patch could be applied to a potential fault location, before the fault has occurred. For example, if the fault typically occurs in the same location (e.g., near the connection lugs or other known area), then the patch could be applied to this area (i.e., the potential fault location) before, during or after fault formation. If the fault has already occurred, then the patch could be applied to the current fault location. The above described methods can be applied to any generator with a wye ring, including but not limited to, wind turbine generators, land or marine based utility scale generators or any suitable generator. The method may also be performed on wind turbine generators in-situ or up-tower, or other land or marine based generators in-situ. As examples only, a land based generator may be located in a power plant, and a marine based generator may be located in a ship.

The method and system of the present invention demonstrates substantially improved results that were unexpected, because a generator having a defective (or failing) wye ring can now be repaired in-situ and up-tower in a wind turbine. Previously, the only known solution was to remove the entire generator and install a new generator (a costly and time consuming endeavor). The method and system of the present invention enables the wind turbine to be restored to operating condition faster and at less expense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for repairing or servicing a wye ring of a generator, the method comprising the steps of:
    dismantling the generator to gain access to the wye ring;
    determining a fault location in the wye ring; and
    attaching an electrically conducting patch to the wye ring in a fault location area, the patch providing an electrical path around the fault location.

2. The method of claim 1, further comprising:
    performing the method on the generator in-situ.

3. The method of claim 1, further comprising:
    rebalancing the generator.

4. The method of claim 1, the determining step further comprising at least one of:
    removing insulation from portions of the wye ring to enable visual identification of the fault location; or
    electrically testing the wye ring to determine the fault location.

5. The method of claim 1, the attaching step further comprising:
    attaching the patch by at least one of, soldering, brazing, electrically conductive adhesive, or mechanical joining.

6. The method of claim 1, further comprising:
    hollowing out a concavity in the wye ring in the fault location area;
    wherein the concavity prevents crack propagation into the patch by formation of a barrier region.

7. The method of claim 1, wherein the patch has a patch end shaped in at least one of the following shapes:
    rectangular, diagonal, rounded, elliptical, triangular or semi-rounded.

8. The method of claim 1, wherein the patch is applied to a radially inner surface of the wye ring.

9. The method of claim 1, further comprising:
    attaching an insulating cuff to the wye ring.

10. The method of claim 9, wherein the cuff is attached to the wye ring with adhesive, and the cuff is substantially C-shaped.

11. A method for servicing a wye ring of a generator, the method comprising the steps of:
    dismantling the generator to gain access to the wye ring;
    attaching an electrically conducting patch to the wye ring in a potential or current fault location, the patch providing an electrical path around the fault location.

12. The method of claim 11, further comprising:
    performing the method on the generator in-situ.

13. The method of claim 11, further comprising at least one of:
    determining a fault location in the wye ring by removing insulation from portions of the wye ring to enable visual identification of the fault location, or electrically testing the wye ring to determine the fault location; or
    rebalancing the generator.

14. The method of claim 11, the attaching step further comprising:
    attaching the patch by at least one of, soldering, brazing, electrically conductive adhesive, or mechanical joining.

15. The method of claim 11, wherein the patch has a patch end shaped in at least one of the following shapes:
    rectangular, diagonal, rounded, elliptical, triangular or semi-rounded.

16. The method of claim 11, further comprising:
    attaching an insulating, substantially C-shaped cuff to at least one of the patch or the wye ring.

17. The method of claim 11, further comprising:
    hollowing out a concavity in the wye ring in an area of the fault location;
    wherein the concavity prevents crack propagation into the patch by formation of a barrier region.

18. A method for servicing a wye ring of a generator, the method comprising the steps of:
    dismantling the generator to gain access to the wye ring;
    attaching an electrically conducting patch to the wye ring in a potential or current fault location, the patch providing an electrical path around the fault location; and
    performing the method on the generator in-situ.

19. The method of claim 18, further comprising at least one of:
    determining a fault location in the wye ring by removing insulation from portions of the wye ring to enable visual identification of the fault location, or electrically testing the wye ring to determine the fault location; or
    rebalancing the generator.

20. The method of claim 19, the attaching step further comprising:
    attaching the patch by at least one of, soldering, brazing, electrically conductive adhesive, or mechanical joining.

21. The method of claim 20, wherein the patch has a patch end shaped in at least one of the following shapes:
    rectangular, diagonal, rounded, elliptical, triangular or semi-rounded.

22. The method of claim 21, further comprising:
    attaching an insulating, substantially C-shaped cuff to at least one of the patch or the wye ring.

23. The method of claim 22, further comprising:
    hollowing out a concavity in the wye ring in an area of the fault location; and
    wherein the concavity is configured to prevent crack propagation into the patch by formation of a barrier region.

* * * * *